Nov. 22, 1960 — B. STERNLICHT — 2,961,277
FUNCTIONAL BEARINGS
Filed Dec. 23, 1957 — 2 Sheets-Sheet 1
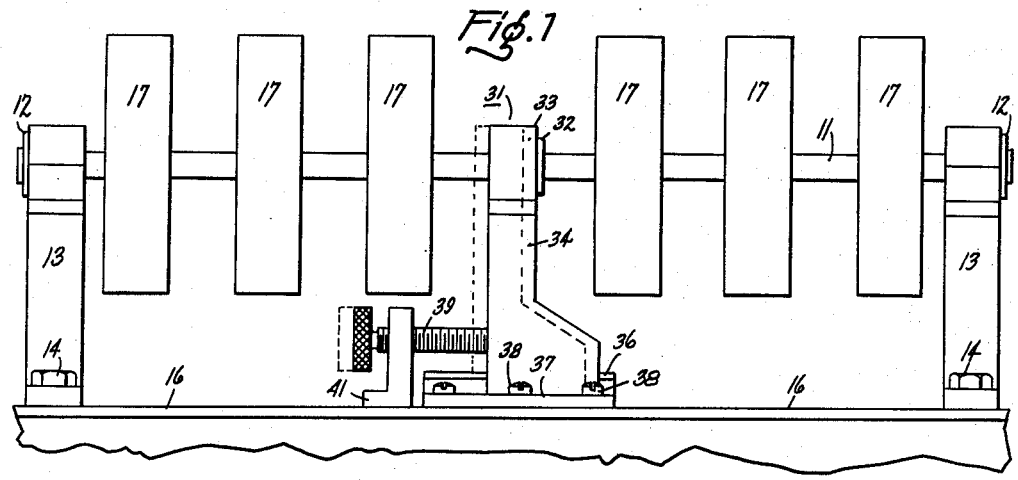
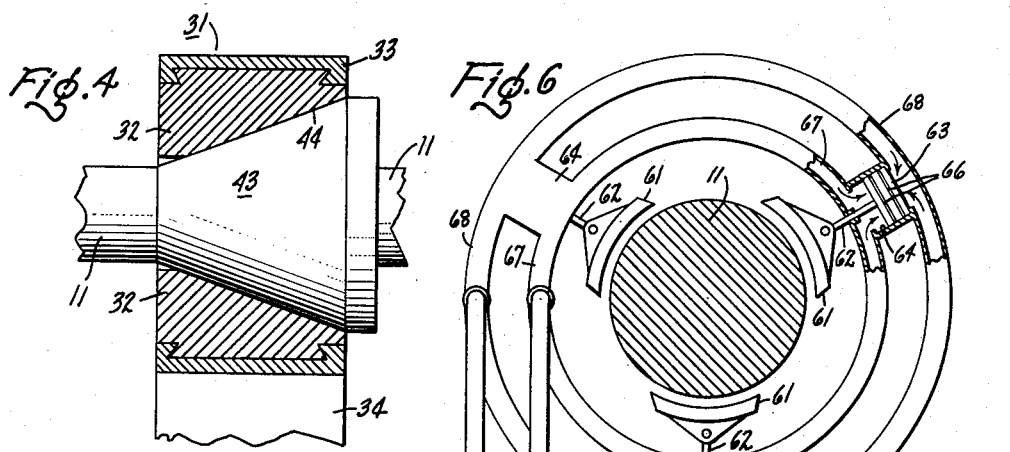
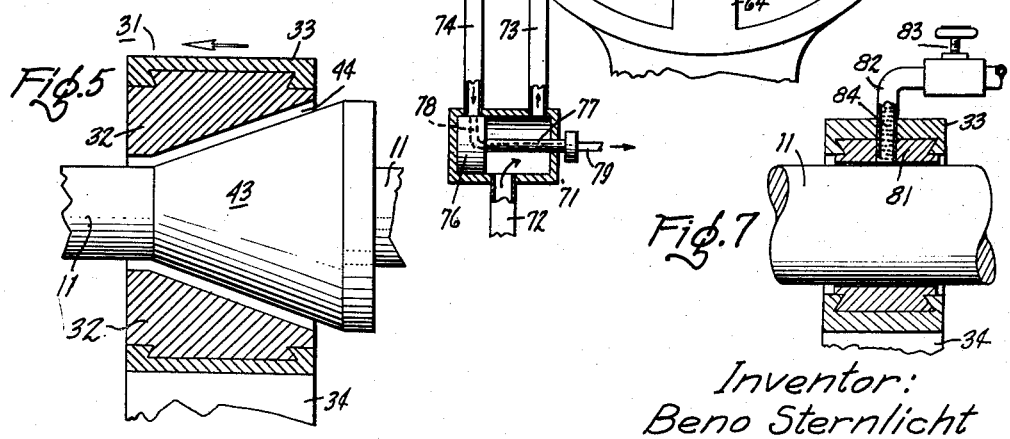
Inventor:
Beno Sternlicht
by I. David Blumenfeld
His Attorney

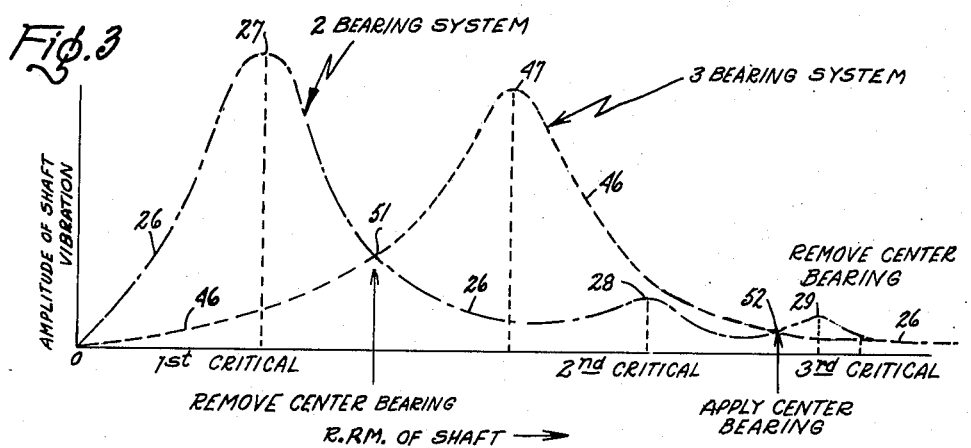
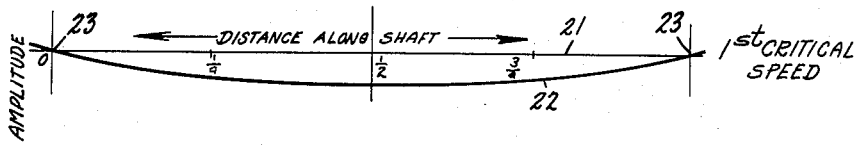
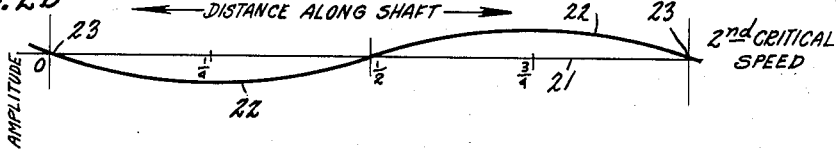
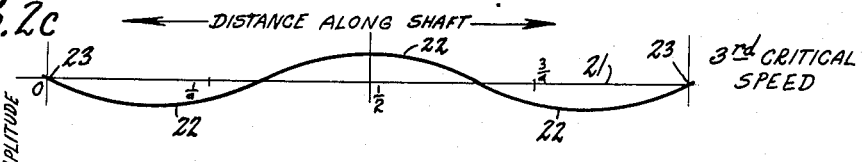
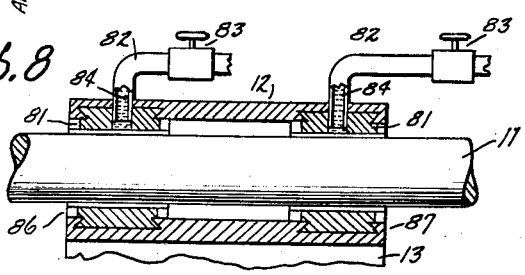

United States Patent Office 2,961,277
Patented Nov. 22, 1960

2,961,277

FUNCTIONAL BEARINGS

Beno Sternlicht, Schenectady, N.Y., assignor to General Electric Company, a corporation of New York Filed Dec. 23, 1957, Ser. No. 704,580

11 Claims. (Cl. 308—78)

The present invention relates to rotating shaft systems and, more particularly, to functional bearings for use with such systems to dampen excessive vibrations.

As is well known, rotating shaft systems are subject to vibration at certain critical speeds and such vibration may be excessive with resultant damage to the system. Various types of stabilization devices have been presented in the past and include devices ranging from the simple bearing support disposed along the shaft at the points of greatest amplitude of vibration to similarly disposed complex bearings having coupled or built-in hydraulic systems for absorbing the energy of vibrations. The bearings of the referenced stabilization systems are such that engagement with the shaft is present at all speeds whether required or not. While the efficiency of suitably lubricated bearings is generally satisfactory, it must not be overlooked that there still remains an amount of frictional loss due to the bearings which appreciably decreases the overall efficiency of the system.

The present invention, in its broader aspects, comprises a rotatable shaft system suitably journaled in a plurality of bearings with the amount of bearing surface engaging the rotating shaft being adjustable.

Accordingly, an object of the present invention is to provide means for increasing the efficiency of rotating shaft systems requiring damping of excessive vibrations at critical speeds.

Another object of the invention is to provide functional bearings which may be effectively removed from the rotating shaft system to reduce frictional losses at such speeds of rotation as the bearings are not required for stability or damping.

A further object of the invention is to provide functional bearings for a rotating shaft system which enables the use of shafts having smaller diameters and flexibility than formerly permitted because of excessive vibrations at critical speeds.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which:

Figure 1 is an elevation of a rotating shaft system, intermediately supported by a functional bearing in accordance with the present invention;

Figures 2A, 2B, and 2C represent a series of vibration diagrams for a rotating shaft system at various speeds of shaft rotation;

Figure 3 is a vibration diagram with amplitude of vibration plotted against speed of rotation of the shaft;

Figure 4 is a cross sectional view of the functional bearing of Figure 1 when engaged with the shaft;

Figure 5 is a cross sectional view of the bearing of Figure 4 illustrating the disengaged position;

Figure 6 is a sectional view of a modification of the functional bearing of Figure 1;

Figure 7 is a sectional view of another modification of the functional bearing of Figure 1; and Figure 8 is a sectional view of a modification of the functional bearing of Figure 7.

Referring now to Figure 1 in detail, I have illustrated a rotatable shaft 11 suitably journaled at the end extremities in bearings 12 mounted on bearing pedestal supports 13. Each of such supports 13 is suitably anchored as by bolts 14 to prevent movement thereof during the stresses and strains developed during rotation of the shaft 11. The supports 13 may, as illustrated in Figure 1, be secured to a common base 16 or to separate stationary bases. The shaft 11 is shown with a plurality of suitably mounted loads 17, indicated diagrammatically, and the loads may be any of the conventional types, such as simple pulleys of power take-off systems or complex turbine blade systems and mechanical couplings to other devices.

In a two-bearing rotating shaft system as described in the foregoing paragraph in operation, an unbalanced condition of the loads 17 or in the driving mechanism (not shown) results in excessive vibration at certain critical speeds of the shaft. The critical speed of a particular rotating shaft is a function of the shaft diameter, mass, the distance between the supporting bearings and bearing characteristics. It has been determined that as the shaft diameter increases the critical speed is increased. On the other hand, as the weight or distance between bearings increases the critical speed is lowered. It follows, therefore, as a limiting case that a system having a bearing continuing for the entire length of the shaft would not have a critical speed until infinite speed of rotation had been reached. It is readily apparent that such a continuous bearing would have advantages in such a rotating shaft system but, on the other hand, an overweighing disadvantage is that of the large frictional losses which would take place.

With many rotating shaft systems the normal operating speed is of such a value that the shaft is subjected to several critical speeds before reaching the operating speed. Thus, as the rotating shaft system starts from rest and increases in speed a first critical speed is reached, and such first critical speed is illustrated in Figure 2A of the drawing. In Figure 2A, the line 21 represents the normal or rest position of the shaft 11, whereas the line 22 represents the distorted shaft at the first critical speed. Also, it is to be noted that the points 23 of such figure indicate the positions of the end bearings 12. Thus, for the first such critical speed the vibration pattern of the shaft is analogous to a half-cycle waveform with the maximum displacement taking place substantially at the center of the shaft 11.

A second critical speed is reached at a higher value of shaft speed of rotation, and it is to be noted in Figure 2B that the distortion of the shaft 11, as again indicated by the line 22, is analogous to a full cycle waveform, or a second harmonic of the waveform at the first critical speed, between the points 23. Under this condition of operation the maximum displacement is seen to be at the ¼ and ¾ points along the shaft with a zero displacement occurring at the one-half point.

At a still greater rotational speed a third critical speed is reached and is indicated in Figure 2C. At such third critical speed the shaft distortion is analogous to one and one-half wave lengths, or a third harmonic of the waveform at the first critical speed, between the points 23. In this instance a point of maximum distortion occurs at the center of the shaft 11 as well as two other points along the distance.

While there are illustrated in Figures 2A, 2B, and 2C three critical speeds, it is to be realized that as shaft rotation increases above the third critical speed that it is possible for more critical speeds to be reached. Thus, for very high speed rotating shaft systems it is possible for five or six critical speeds to be encountered between the starting and the reaching of the normal operating speed.

The relative amplitudes of the vibrations existing at the various critical speeds, as shown in Figures 2A, 2B and 2C, have not been shown for simplicity of illustration. Such relative amplitudes, however, may be seen in Figure 3 where the dot-dash line 26 goes through three critical speeds as indicated by the numerals 27, 28 and 29, respectively. It is to be noted that the first critical speed 27 has a much greater amplitude of shaft vibration attendant with it than is present at the other two critical speeds 28, 29.

To reduce the amplitude of vibration at the critical speeds and thereby prevent damage to the system, I provide functional bearings at those points along the shaft 11 where the amplitude of vibration becomes excessive. Thus, for a rotating shaft system where the amplitude of vibration of the odd numbered critical speeds is to be damped, I provide a functional, or auxiliary, bearing at the center position of the shaft 11. As illustrated in Figure 1 such functional bearing, generally indicated by the numeral 31, comprises a bearing 32 suitably mounted in a housing 33 which, in turn, is supported by an adjustable support 34. The lower extremity of the support 34 suitably engages a rail 36, which is carried by a base 37 to extend parallel to the axis of the shaft 11 and such base is secured against movement as by a plurality of bolts 38. To adjust the position of the functional bearing 31 along the rail 36 a thumb screw 39, suitably threaded through a supporting bracket 41 is provided to engage the support 34 and thereby provide movement of the functional bearing 31 axially with respect to the shaft 11.

As may be better seen in Figure 4, the shaft 11 is provided with an axially tapered journal 43 disposed substantially mid-way between the end bearings 12 of the shaft 11. Also, the bearing surface 44 of the bearing 32 is provided with a matching taper. Thus, by action of the thumb screw 39 the functional bearing 31 may be moved axially toward the large end of the tapered journal to engage the shaft 11 as both a journal and a thrust bearing, as illustrated in Figure 4, or toward the small end of the taper to a position of disengagement, as illustrated in Figure 5. In the latter position the functional bearing 31 is moved far enough so that any film of lubrication is broken between the shaft 11 and the bearing 32 and the shaft is thereby rotating in air with no contact with the bearing.

The effect of adding the functional bearing 31 to provide a three-bearing system is illustrated in Figure 3 by the dashed line 46. In such drawing it is to be noted that the rotational speed at which the first critical speed 47 occurs is shifted to a greater value and that the amplitude of such first critical speed is reduced somewhat over that of the two-bearing system because of the increased damping.

In operation of a three-bearing rotating shaft system as described in the foregoing paragraph, the functional bearing 31 is moved into engagement with the tapered journal 43 of the shaft 11 at the start of the rotation of the shaft 11. As the speed of rotation increases the amplitude of shaft vibration increases along the dashed line 46 of Figure 3 in a much reduced manner in comparison with the operation of a two-bearing system. At a speed 51 where the amplitude of vibration, as indicated by the line 46, equals the amplitude of the vibration of the two-bearing system as indicated by the line 26, the thumb screw 39 is operated to move the functional bearing 31 out of engagement with the shaft 11. It is to be noted in Figure 3 that the point 51 lies above the speed of the first critical speed 27 of the two-bearing system but below the speed of the first critical speed 47 of the three-bearing system. Next, as the speed of rotation of the system increases from the speed 51 the amplitude of vibration decreases along the line 26 of the two-bearing system toward the second critical speed 28 of the two bearing system. Since a vibration node appears at the center of the shaft 11 at the second critical speed 28 of the two bearing system, the functional bearing 31 is not activated or engaged with the shaft. As the speed of rotation of the shaft 11 increases beyond the second critical speed 28 toward the third critical speed 29 the amplitude lines 26 and 46 of the two-bearing and three-bearing system again intersect at a speed 52. At such speed 52 the functional bearing 31 is again actuated to engage the shaft 11 so that the amplitude of vibration again follows the line 46 of Figure 3.

Thus, it is seen that from start-up to a speed greater than the third critical speed that the shaft rotation is carried through the first and third critical speed regions 27, 29, respectively, without having an amplitude of vibration which would be encountered should the outlined engagement and disengagement of the functional bearing 31 not be followed.

Since the foregoing statement is not applicable with respect to the second critical speed 28, additional functional bearings may be placed at the ¼ and ¾ points along the shaft 11 so that the maximum distortions occurring at those points, as seen in Figure 2B, are suitably damped in a manner similar to that described in the foregoing. The effect of such additional functional bearings is again to displace the value of the second critical speed 28 to a higher value so that as soon as the second critical speed region has been passed such additional bearings are disengaged from the shaft 11.

A functional bearing similar to that of Figures 1, 4 and 5, is illustrated in Figure 6 and comprises in general a plurality of bearing segments 61 disposed for radial movement to engage or disengage the rotatable shaft 11. Each of such bearing segments 61 is suitably secured to a piston rod 62 which, in turn, suitably engages a piston 63. The piston 63 is disposed within a cylinder 64 and is provided with rings 66 in a conventional manner. To reciprocate the piston 63 within the cylinder 64 a first annular hollow tube 67 communicates with each of the cylinders below the pistons and a second annular hollow tube 68 similarly communicates with the cylinders above the pistons.

A source of fluid (not shown) under pressure is alternately connected to the annular rings 67, 68 depending upon whether the bearing segments are to be engaged or disengaged with the shaft 11. Such action may be readily accomplished by a variety of systems, such as a cylinder 71, connected to the source of fluid under pressure by an intake pipe 72. The annular tubes 67, 68 are separately connected to the cylinder 71 by pipes 73 and 74, respectively. A piston 76 is slidably disposed within the cylinder 71 and is provided with a hollow piston rod 77 projecting externally of the cylinder 71. The intake pipe 72 and the connecting pipes 73, 74 are connected to the cylinder 71 is such a manner that with the piston 76 in a forward position the fluid from the pipe 72 flows through the cylinder into one pipe 73, while with the piston in the withdrawn position the fluid flows from the intake pipe through the cylinder into the other pipe 74. To provide a release of pressure during either position of the piston 76 a communicating channel 78 is provided within the piston 76 to the hollow piston rod 77. Also, a take-off pipe 79 is provided externally of the cylinder 71 extending from the hollow piston rod to the source of fluid under pressure, where such fluid may be re-used. Thus, as illustrated in Figure 6, the fluid under pressure proceeds through the pipe 72 into the cylinder 71 and thence into the pipe 73. The fluid then proceeds through to the annular pipe 67 to force the pistons 63 outwardly to disengage the bearing segments 61 from the shaft 11. Fluid pressure at the tops of the cylinders 64 is released through the pipe 74, through the channel 78 and thence through the hollow stem 77 to be returned to the source of fluid by the take-off pipe 79.

With such a functional bearing suitably mounted on the support 34 of Figure 1, the adjustable feature provided by the thumb screw 39 may be eliminated and the support suitably anchored to prevent movement. The activation of the functional bearing is accomplished by the position of the piston 76 within the cylinder 71 to engage or disengage the bearing segments 61 with respect to the shaft 11. While the functional bearing of Figure 6 is illustrated as having three segments 61, it is to be realized that a greater or lesser number of segments may be used in a similar manner for radial operation to engage and disengage the shaft 11 to accomplish the objects of the invention.

Another functional bearing is illustrated in Figure 7 and comprises, in general, a cylindrical bearing 81 having a lubrication line 82 communicating with the surface of the bearing. At the speeds at which such functional bearing is to be utilized to dampen the oscillations of the shaft 11, a valve 83 in the lubrication line is opened to provide a copious supply of lubricant 84 between the bearing and the shaft for hydrostatic or hydrodynamic operation. Alternatively, at such time as the bearing is not needed in the system, the lubricant is cut-off by operation of the valve 83 so that the shaft 11 is rotating in air without contact with the bearing 81. As illustrated, the valve 83 is a manually operated valve; however, such valve could readily be of the solenoid actuated type or could be operated in any other conventional manner.

In Figure 8 there is illustrated an end bearing 12 comprising two spaced-apart sections 86, 87 of the bearing 81, as described in connection with Figure 7. Each of the bearings 81 are cylindrical and are spaced from each other by a short distance. It will be noted by reference to Figure 2 that as the shaft vibrates through the various critical speeds illustrated that a substantial angular force is present at the end bearings in each instance. To compensate for such forces the two-section end bearing of Figure 8 is utilized. From the time the rotating system is started up until it reaches its normal operating speed both valves 83 are open to provide a suitable supply of lubricant 84 between the bearings 81 and the shaft 11. When the normal operating speed is reached either of the valves 83 may be closed to cut-off the lubricant to one of the sections 86 or 87 of such bearing. In this manner the amount of bearing surface in contact with the shaft 11 is limited, since the section without lubricant has no effect upon the system.

The latter described functional bearings may be applied to rotating shaft systems for the damping of vibrations at critical speeds in the same manner as set forth in detail with respect to that illustrated in Figure 1. The "activation" of the functional bearings to engage and disengage the shaft of a rotating shaft system may be readily governed by a vibration amplitude indicator, or by a revolutions-per-minute indicator after the vibration amplitude-to-rotational speed characteristics has been determined.

While particular embodiments of this invention have been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a rotating shaft system, the combination comprising a rotatable shaft journaled between spaced-apart support bearings, at least one auxiliary bearing disposed intermediate said spaced-apart support bearings to engage a journal of said shaft during critical speeds of said shaft and minimize vibration, and means coupled to said auxiliary bearing for moving such bearing axially along said shaft to disengage said journal at other than critical speeds of said shaft.

2. In a rotating shaft system, the combination comprising a rotatable shaft journaled between spaced-apart support bearings, and carrying a rotatable load therebetween, and producing excessive vibration at a point between said supports at a critical speed, at least one auxiliary segmented bearing disposed near said point to engage a journal of said shaft to restrain radial movement of the shaft substantially about 360° to minimize vibration, and means coupled to said auxiliary bearing for moving the segments radially to disengage said journal at other than critical speeds of said shaft.

3. In a rotating shaft system, the combination comprising a rotatable shaft journaled between spaced-apart support bearings, at least one auxiliary bearing disposed intermediate said spaced-apart support bearings to engage said shaft during critical speeds of said shaft and minimize vibration, means connected to said auxiliary bearing for providing a flow of lubricant to the region between said shaft and auxiliary bearing during such engagement, and means included in said last means for stopping said flow of lubricant at other than said critical speeds whereby said shaft rotates in air without contact with said auxiliary bearing.

4. In a rotating shaft system, the combination comprising a rotatable shaft journaled between spaced-apart support bearings, at least one auxiliary bearing having an axially tapered bearing surface disposed intermediate of said support bearings to engage a journal of matching taper on said shaft during critical speeds of said shaft and minimize vibration, and means coupled to said auxiliary bearing for moving such bearing axially along said shaft to disengage said journal at other than critical speeds.

5. In combination, a shaft, a plurality of bearings spaced apart longitudinally of said shaft, said shaft being subject to excessive vibration between said bearings at a critical speed, a plurality of journals spaced longitudinally of the shaft each cooperating with respective bearings, said bearings having substantially annular surfaces, means to cause flow of lubricant between each of said bearings and its respective journal to produce a lubricant film therebetween to carry the load of said shaft while the shaft is operating at said critical speed thereby to suppress said vibration, and means to interrupt the flow of lubricant between one of said journals and its bearing to interrupt said film while maintaining said film between the other of said journals and its bearing, the spacing between said one journal and its bearing being such that said last bearing and said one journal offer no support to said shaft when said film is interrupted whereby said means may be operated when the shaft is operating at a speed different from said critical speed.

6. In combination, a rotatable shaft, three bearings supporting said shaft and spaced apart along the length thereof, said bearings adapted to support said shaft substantially about 360°, means to render the intermediate bearing inoperative to support said shaft, said shaft having a low critical speed at which maximum vibration occurs when supported only by said other two bearings, and having low vibration at said critical speed and high vibration at a higher critical speed when supported by said three bearings whereby in increasing the speed of said shaft from zero all bearings may be utilized to support said shaft until the first critical speed is exceeded and thereafter and before said second critical speed is reached said means may be operated to render non-supporting said intermediate bearing whereby excessive vibration at both critical speeds is avoided.

7. In combination, a shaft arranged for rotation in three bearing supports spaced along the length thereof, said shaft having maximum vibration at a higher critical speed when supported by said three bearings, means to render one of said bearings inoperative to support said shaft, said last mentioned bearing being adapted to support said shaft substantially about 360°, said shaft then having maximum vibration at a lower critical speed and having lower vibration at said higher critical speed whereby the speed of said shaft may be increased through said lower critical speed while all three bearings are operative to support said shaft and said one bearing may be made inoperative at a speed between said critical speeds whereby excessive vibration at both critical speeds is avoided.

8. A rotating shaft system comprising a shaft arranged for rotation in two bearings spaced apart and having maxima of vibration at different critical speeds below its normal operating speed, means to avoid said maxima of vibration as the shaft speed is increased from zero to said normal operating speed, said means comprising a third bearing support adapted to restrain radial movement of the shaft substantially about 360° and spaced at a point in the shaft such that the vibration of the shaft when supported by all three bearings is maximum at a frequency between two of said first mentioned maxima and has vibration at said first two mentioned maxima lower than when supported by only two bearings, and means to render said third bearing alternatively supporting and non-supporting whereby said third bearing may be controlled to avoid all of said maxima of vibration.

9. In a rotating shaft system, the combination comprising a rotatable shaft journalled between spaced-apart supports, a rotatable load mounted on said rotatable shaft between said supports, at least one auxiliary support disposed intermediate said spaced-apart supports to engage said shaft during operation at critical speeds of said shaft to restrain radial movement of the shaft substantially about 360° to minimize vibration, and means coupled to said auxiliary support for disengaging said auxiliary support from said shaft at other than critical speeds of said shaft.

10. In a rotating shaft system, the combination comprising a rotatable shaft journalled between spaced-apart supports, a rotatable load mounted on said rotatable shaft between said supports, at least one auxiliary bearing disposed intermediate said spaced-apart supports to engage said shaft during critical speeds of said shaft to restrain radial movement of the shaft substantially about 360° to minimize vibration, and means coupled to said auxiliary bearing for disengaging said auxiliary bearing from said journal at other than critical speeds of said shaft.

11. In a rotating shaft system, the combination comprising a rotatable shaft journalled between spaced-apart support bearings, a rotatable load mounted on said rotatable shaft between said support bearings, at least one auxiliary bearing disposed intermediate said spaced-apart support bearings to engage said shaft to restrain radial movement of the shaft substantially about 360° to minimize vibration, said auxiliary bearing having a plurality of separate bearing surfaces mounted about said shaft for radial movement with respect to said shaft, and means adapted to cause engagement of said bearing surfaces with said shaft during critical speeds of said shaft and to cause disengagement of said bearing surfaces at other speeds of said shaft.

References Cited in the file of this patent

UNITED STATES PATENTS

| | | |
|---|---|---|
| 315,777 | Hallock | Apr. 14, 1885 |
| 1,697,046 | Chapman et al. | Jan. 1, 1929 |
| 2,003,316 | Schein | June 4, 1935 |
| 2,711,934 | Rickermann | June 28, 1955 |
| 2,729,518 | O'Connor | Jan. 3, 1956 |